(12) United States Patent
Wang et al.

(10) Patent No.: US 8,996,055 B2
(45) Date of Patent: Mar. 31, 2015

(54) METHOD AND APPARATUS FOR REPORTING A POWER HEADROOM REPORT (PHR) IN A CARRIER AGGREGATION SCENE

(75) Inventors: Jian Wang, Shenzhen (CN); Yada Huang, Shenzhen (CN); Zhongda Du, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 324 days.

(21) Appl. No.: 13/574,680

(22) PCT Filed: Sep. 20, 2011

(86) PCT No.: PCT/CN2011/079873
§ 371 (c)(1),
(2), (4) Date: Jul. 23, 2012

(87) PCT Pub. No.: WO2012/041170
PCT Pub. Date: Apr. 5, 2012

(65) Prior Publication Data
US 2012/0294267 A1    Nov. 22, 2012

(30) Foreign Application Priority Data
Sep. 30, 2010    (CN) .......................... 2010 1 0513116

(51) Int. Cl.
*H04B 7/00*    (2006.01)
(Continued)

(52) U.S. Cl.
CPC ............ *H04W 52/365* (2013.01); *H04W 52/58* (2013.01); *H04L 5/001* (2013.01); *H04W 52/34* (2013.01)
USPC ........... 455/522; 455/69; 455/452.1; 455/509

(58) Field of Classification Search
CPC ...................... H04W 72/0413; H04W 72/0453
USPC ............... 455/69, 522, 450, 452.1, 509, 464; 370/329, 328, 318
See application file for complete search history.

(56) References Cited

U.S. PATENT DOCUMENTS

2012/0087317 A1*    4/2012    Bostrom et al. .............. 370/329
(Continued)

FOREIGN PATENT DOCUMENTS

| CN | 101715207 | 5/2010 |
|---|---|---|
| CN | 101778416 | 7/2010 |
| EP | 2472942 | 7/2012 |

OTHER PUBLICATIONS

Nokia Siemens Networks, Nokia Corporation, Aug. 23-27, 2010, 3GPP TSG-RAN WG2 Meeting #71, "Further consideration on virtual PHR", 4 Pages.

ZTE Jul. 23-26, 2010, 3GPP TSG-RAN WG2 #71, "PHR remain issue", 4 Pages.

(Continued)

*Primary Examiner* — John J Lee
(74) *Attorney, Agent, or Firm* — Brooks Kushman P.C.

(57) ABSTRACT

A method and apparatus are disclosed for reporting a power headroom report (PHR) in a carrier aggregation scenario. The method includes the following steps: when a user equipment (UE) reports the PHR in a scenario where a physical uplink control channel (PUCCH) and a physical uplink shared channel (PUSCH) can be transmitted concurrently, if no PUSCH is transmitted over the Uplink Primary Component Carrier (UL PCC) configured by an eNB for the UE, then a virtual type1 PH and/or a virtual type2 PH corresponding to the UL PCC are reported; if a PUSCH rather than a PUCCH is transmitted over the UL PCC configured by the eNB for the UE, then the type1 PH corresponding to the UL PCC is reported or the virtual type2 PH and the type1 PH corresponding to the UL PCC are reported. User equipment is also disclosed.

20 Claims, 3 Drawing Sheets

(51) Int. Cl.
  *H04W 52/00* (2009.01)
  *H04W 52/36* (2009.01)
  *H04W 52/58* (2009.01)
  *H04L 5/00* (2006.01)
  *H04W 52/34* (2009.01)

(56) References Cited

U.S. PATENT DOCUMENTS

2013/0010720 A1* 1/2013 Lohr et al. .................... 370/329
2013/0188570 A1* 7/2013 Zhao et al. .................... 370/329
2013/0215824 A1* 8/2013 Wang et al. .................... 370/328

OTHER PUBLICATIONS

International Search Report for PCT/CN2011/079873, English translation attached to original, Both completed by the Chinese Patent Office on Dec. 8, 2011, All together 5 Pages.
Extended European Search Report for EP 11828066.8, Completed by the European Patent Office on Oct. 1, 2013, 11 Pages.
ZTE 3GPP TSG RAN WG2 No. 70bis, Jun. 28-Jul. 2, 2010, 5 Pages, "Parallel transmission of two types PHR."
Panasonic 3GPP TSG-RAN WG2 No. 71, Aug. 23-27, 2010, 2 Pages, "Virtual power headroom report."
ZTE 3GPP TSG-RAN WG2 No. 71, Jul. 23-26, 2010, 4 Pages, "PHR remain issue."

* cited by examiner

| t1/t2/t12 | x1 | x1 | x1 | x1 | x1 | x1 |
|---|---|---|---|---|---|---|
| x1 | x1 | x1 | x1 | x1 | x1 | x1 | x1 |
| x1 | x1 | x1 | x1 | x1 | x1 | x1 | x1 |
| x1 | x1 | x1 | x1 | x1 | x1 | x1 | x1 |
| x2 | x2 | x2 | x2 | x2 | x2 | | |

FIG. 2

| R | R | E | 1 | 1 | 0 | 0 | 1 | — LCID=11001 |
|---|---|---|---|---|---|---|---|---|
| F | L | | | | | | | |

FIG. 3

| R | R | x1 | x1 | x1 | x1 | x1 | x1 | Configured CC1 |
|---|---|---|---|---|---|---|---|---|
| R | R | x2 | x2 | x2 | x2 | x2 | x2 | Configured CC2 (UL PCC type2 PH) |
| R | R | x1 | x1 | x1 | x1 | x1 | x1 | Configured CC3 |
| R | R | x1 | x1 | x1 | x1 | x1 | x1 | Configured CC4 |
| R | R | x1 | x1 | x1 | x1 | x1 | x1 | Configured CC5 |

FIG. 4

| t1/t2/t12 | x1 | x1 | x1 | x1 | x1 | x1 |
|---|---|---|---|---|---|---|
| x1 | x1 | x1 | x1 | x1 | x1 | x1 | x1 |
| x1 | x1 | x1 | x1 | x1 | x1 | x1 | x1 |
| x1 | x1 | x1 | x1 | x1 | x1 | x1 | x1 |
| x2 | x2 | x2 | x2 | x2 | x2 | | |

FIG. 5

METHOD AND APPARATUS FOR REPORTING A POWER HEADROOM REPORT (PHR) IN A CARRIER AGGREGATION SCENE

CROSS-REFERENCE TO RELATED APPLICATION

This application is the U.S. national phase of PCT Appln. No. PCT/CN2011/079873 filed Sep. 20, 2011 which claims priority to Chinese Application No. 201010513116.7 filed Sep. 30, 2010, the disclosures of which are incorporated in their entirety by reference herein.

TECHNICAL FIELD

The present invention relates to Long Term Evolution-Advanced technology of the mobile communication system, and in particular, to a method and apparatus for reporting a power headroom report (PHR) in a carrier aggregation scenario in the Long Term Evolution-Advanced technology.

BACKGROUND OF THE RELATED ART

The Long Term Evolution (LTE) system is the new generation of mobile communication system initiated by the $3^{th}$ Generation Partner Plan (3GPP) organization in 2004, and that system adopts the wireless access technology based on the Orthogonal Frequency Division Multiplex (OFDM) and can reach the uplink speed of 50 Mbit/s and downlink speed of 100 Mbit/s with the bandwidth being 20M. The LTE-Advanced system is the newest generation of mobile communication system initiated by the 3GPP organization in 2008, and that system adopts the wireless access technology of the carrier aggregation and can run a plurality of pairs of uplink and downlink carriers which are of 20M at most at the same time, and the downlink speed can reach 1 Gbit/s and the uplink speed can reach 500 Mbit/s.

In order to compensate the path loss of the wireless channel and suppress the inter-cell interference, both the LTE and the LTE-Advanced need to perform the power control on the physical uplink shared channel. The main process of the uplink power control of the LTE is that: (1) the User Equipment (UE) receives the Transmission Power Control (TPC) command of the Evolved NodeB (eNB); (2) the UE measures the reference signal reception power (RSRP) of the downlink wireless channel, and calculates the Pathloss. The UE calculates the transmission power P by using the parameters, such as the Pathloss, the uplink shared channel bandwidth, the transmission block format, and the TPC, etc.; if the user equipment triggers the Power Headroom Report (PHR), and the transmission condition is met, then the UE also needs to send the PHR in the uplink shared channel. (3) After receiving the data and/or the PHR of the physical uplink shared channel, the eNB sends the TPC command to the UE through the Physical Downlink Control Channel (PDCCH) of the Downlink Control Information (DCI Format) 0/3/3. (4) After receiving the TPC command, the UE returns back to (1).

Different from the mobile access system such as the Wideband Code Division Multiple Access (WCDMA), etc., the LTE UE adopts the dynamic resource allocation mode, and adopts the adaptive channel coding modulation mode. The LTE UE uplink transmission power is related to the resource allocation and the coding modulation scheme, so the individual power control mode is not enough to complete the power control task of the LTE UE. The PHR sent to the eNB through the UE acts as the resource budget information of the Physical Uplink Shared Channel (PUSCH), according to which the eNB performs the uplink resource allocation. If the PHR reflects that the UE has greater power headroom, then the eNB can allocate more wireless resource blocks for the UE; if the PHR reflects that UE has no power headroom or has not more power headroom, then the eNB can only allocate less wireless resource block or the low-order modulation command to the UE. The PHR transmission frequency of the UE to the eNB is lower than the TPC transmission frequency of the eNB to the UE in the LTE system. The transmission of the PHR needs two steps: triggering at first, and then reporting. The UE triggers the PHR reporting when the cycle PHR timer expires, or the pathloss changes greatly, or the PHR is configured or re-configured, and after the UE obtains enough PUSCH resources used for the PHR reporting, the UE reports PHR to the eNB.

There are a plurality of component carriers in the LTE-Advanced, and each component carrier (CC) uses a separate power control process. Therefore the Power Headroom (PH) of each component carrier needs to be fed back separately. What is different from the LTE REL-8/REL-9UE is that there are two possible modes for sending the Physical Uplink Control Channel (PUCCH) and the PUSCH with the Uplink Primary Component Carrier (UL PCC) of the LTE-Advanced UE: (1) type1: the PUSCH and the PUCCH of the UL PCC are sent at different times, which is similar to the REL-8/REL-9. (2) type2: the PUSCH and the PUCCH of the UL PCC are sent at the same time.

At present, for the UE running in the mode 1, at a certain subframe, when the PHR is sent, only the Type1 PHR needs to be reported, no matter with the UL PCC or the Uplink Secondary Component Carriers (UL SCC). In the linear domain, the Type1 PHR is defined as the total power of the UL PCC deducted by the transmission power of the PUSCH channel, for example, $$\text{Type1}PH{:}PH1 = PH_{pusch} = P_{cmaxc} - P_{pusch}$$

wherein, the $P_{cmaxc}$ is the maximum transmission power of the UL PCC, and the $P_{pusch}$ is the PUSCH transmission power of the UL PCC.

For the subframe running in the mode 2, at a certain subframe, when the PHR is sent, as to the UL SCC, only the Type1 PHR needs to be sent; as to the UL PCC, if the PUSCH and the PUCCH on the UL PCC both need to be sent, then the UE should report the Type1 PHR and the Type2 PHR at that subframe. In the linear domain, the Type2 PHR is defined as the total power of the UL PCC deducted by the transmission power of the PUSCH channel and the transmission power of the PUCCH channel, for example:

$$\text{Type2}PH{:}PH2 = PH_{pusch+pucch} = P_{cmaxc} - P_{pucch} - P_{pusch}$$

wherein, the $P_{cmaxc}$ is the maximum transmission power of the UL PCC, the $P_{pucch}$ is the PUCCH transmission power of the UL PCC, and the $P_{pusch}$ is the PUSCH transmission power of the UL PCC.

However, for the scenario that the UL PCC needs to send the PUSCH but not send the PUCCH, or the scenario that the UL PCC needs to send the PUCCH but not send the PUSCH, or the scenario that the UL PCC need neither to send the PUCCH nor to send the PUSCH, the problem required to be solved by the present invention is which PHRs are reported.

SUMMARY OF THE INVENTION

The object of the present invention is to provide a method and apparatus for reporting a power headroom report (PHR) in a carrier aggregation scenario, to solve the problem how to provide the corresponding method for reporting the PHR regarding to various transmission scenarios effectively and provide basis for the eNB to better perform the uplink scheduling.

In order to solve the above-mentioned technical problem, the present invention provides a method for reporting a power headroom report (PHR) in a carrier aggregation scenario, comprising:

when a user equipment (UE) reports the PHR in a scenario where a physical uplink control channel (PUCCH) and a physical uplink shared channel (PUSCH) can be transmitted concurrently, if no PUSCH is transmitted over an Uplink Primary Component Carrier (UL PCC) configured by a base station (eNB) for the UE, reporting a virtual type1 PH and/or a virtual type2 PH corresponding to the UL PCC; if the PUSCH rather than the PUCCH is transmitted over the UL PCC configured by the eNB for the UE, reporting a type1 PH corresponding to the UL PCC or reporting the virtual type2 PH and the type1 PH corresponding to the UL PCC; wherein, the virtual type1 PH is a type1 PH calculated when taking a transmission power of the PUSCH channel in a reference format as the transmission power of the PUSCH channel if no PUSCH is transmitted; and the virtual type2 PH is a type2 PH calculated when taking the transmission power of the PUSCH channel in a reference format or the transmission power of the PUSCH channel with 0 power as the transmission power of the PUSCH channel if no PUSCH is transmitted, and/or, taking the transmission power of the PUCCH channel in a reference format as the transmission power of the PUCCH channel if no PUCCH is transmitted.

The method further comprises:

when the UE reports the PHR in the scenario where the PUCCH and PUSCH can be transmitted concurrently, if no PUSCH is transmitted over the Uplink Secondary Component Carrier (UL SCC) configured by the eNB for the UE, reporting a virtual type1 PH corresponding to the UL SCC.

In the method of the present invention, the PHR reported by the UE comprises PHs corresponding to all Uplink Component Carriers (UL CC) configured by the eNB for the UE; or PHs corresponding to all activated UL CCs in the UL CCs configured by the eNB for the UE are reported; or all UL CCs with data scheduling in the UL CCs configured by the eNB for the UE are reported.

The method further comprises:

the UE encapsulating all or part of the PHs corresponding to the UL CC which need to be reported in an identical PHR in order, and carrying one piece of mode indicating information in the PHR, and then reporting the PHR to the eNB; or carrying the mode indicating information with a logical channel identifier (LCID) corresponding to the PHR, reporting the mode indicating information along with the PHR to the eNB; wherein, the mode indicating information is used to indicate 3 modes of the PHR, wherein: in the first mode, the PHR comprises the type1 PH corresponding to the UL PCC and the type1 PH corresponding to the UL SCC; in the second mode, the PHR comprises the type1 PH and the type2 PH corresponding to the UL PCC, and the type1 PH corresponding to the UL SCC; in the third mode, the PHR comprises the type2 PH corresponding to the UL PCC, and the type1 PH corresponding to the UL SCC.

The method further comprises:

when the UE reports the PHR, if it is detected that a power backoff occurs, further encapsulating the UE specific PH into the PHR, and carrying one piece of power backoff indicating information in the PHR, and then reporting the PHR to the eNB;

or, if it is detected that a power backoff occurs, then encapsulating the UE specific PH as one PHR separately, and carrying one piece of power backoff indicating information in the PHR encapsulated with the UE specific PH, and then reporting the PHR to the eNB; or carrying the power backoff indicating information with the LCID corresponding to the PHR, and reporting the power backoff indicating information along with the PHR to the eNB.

In the method of the present invention, in the step of the UE encapsulating all or part of the PHs corresponding to the UL CC which need to be reported in an identical PHR in order, when the UE encapsulates the PHR, one PH is carried by one byte in the PHR, which comprises: taking the first 2 bits of one byte as reserved bits, and leaving the following 6 bits to carry one PH;

or, taking every 6 bits of the PHR to carry one PH, and leaving 6 bits following said 6 bits to carry another PH.

In the method of the present invention, the UE takes a plurality of bits in the first byte according to a preset order in the PHR to respectively indicate whether each UL CC configured by the UE reports the PH; or the UE, when taking every 6 bits of the PHR to carry one PH, further adds several bits as PH identification bits among every 2 PHRs to indicate the UL CC to which each PH belongs.

The method further comprises:

the eNB further notifying the UE to suspend or resume uploading of the virtual type2 PH through a RRC signaling; and the UE further suspending or resuming the uploading of the virtual type2 PH according to the RRC signaling sent by the eNB.

The method further comprises:

the UE further judging whether each type2 PH to be reported is a negative number when uploading the PHR, if yes, not reporting that type2 PH.

The method further comprises:

when the UE uploads the PHR, encapsulating the type1 PH in the PHs corresponding to the UL CC which needs to be reported as one PHR and sending to the eNB first, then, according to a preset priority, sending data of which the priority is higher than that of the type2 PH to the eNB, and later if there are enough resources to report the type2 PH, then encapsulating the type2 PH in the PHs corresponding to the UL CC which needs to be reported as one PHR and sending to the eNB.

In order to solve the above-mentioned technical problem, the present invention further provides an apparatus for reporting a power headroom report (PHR) in a carrier aggregation scenario, comprising a user equipment (UE) and a base station (eNB), wherein:

the UE is configured to, when reporting the PHR in a scenario where a physical uplink control channel (PUCCH) and a physical uplink shared channel (PUSCH) can be transmitted concurrently, if no PUSCH is transmitted over an Uplink Primary Component Carrier (UL PCC) configured by the base station (eNB) for the UE, then report a virtual type1 PH and/or a virtual type2 PH corresponding to the UL PCC; if the PUSCH rather than the PUCCH is transmitted over the UL PCC configured by the eNB for the UE, then report a type1 PH corresponding to the UL PCC or report the virtual type2 PH and the type1 PH corresponding to the UL PCC; wherein, the virtual type1 PH is a type1 PH calculated when taking a transmission power of the PUSCH channel in a reference format as the transmission power of the PUSCH channel if no PUSCH is transmitted; and the virtual type2 PH is a type2 PH calculated when taking the transmission power of the PUSCH channel in a reference format or the transmission power of the PUSCH channel with 0 power as the transmission power of the PUSCH channel if no PUSCH is transmitted, and/or, taking the transmission power of the PUCCH channel in a reference format as the transmission power of the PUCCH channel if no PUCCH is transmitted.

In the apparatus of the present invention, the UE is further configured to, when reporting the PHR in the scenario where the PUCCH and PUSCH can be transmitted concurrently, if no PUSCH is transmitted over the Uplink Secondary Component Carrier (UL SCC) configured by the eNB for the UE, report a virtual type1 PH corresponding to the UL SCC.

In the apparatus of the present invention, the PHR reported by the UE comprises PHs corresponding to all Uplink Component Carriers (UL CC) configured by the eNB for the UE; or PHs corresponding to all activated UL CCs in the UL CCs configured by the eNB for the UE are reported; or all UL CCs with data scheduling in the UL CCs configured by the eNB for the UE are reported.

In the apparatus of the present invention, the UE is further configured to encapsulate all or part of the PHs corresponding to the UL CC which need to be reported in an identical PHR in order, and carry one piece of mode indicating information in the PHR, and then report the PHR to the eNB; or carry the mode indicating information by using a logical channel identifier (LCID) corresponding to the PHR, and report to the eNB the mode indicating information along with the PHR; wherein, the mode indicating information is used to indicate 3 modes of the PHR, wherein: in the first mode, the PHR comprises the type1 PH corresponding to the UL PCC and the type1 PH corresponding to the UL SCC; in the second mode, the PHR comprises the type2 PH and the type1 PH corresponding to the UL PCC, and the type1 PH corresponding to the UL SCC; in the third mode, the PHR comprises the type2 PH corresponding to the UL PCC, and the type1 PH corresponding to the UL SCC.

In the apparatus of the present invention, the UE is further configured to, when reporting the PHR, if it is detected that a power backoff occurs, further encapsulate the UE specific PH into the PHR, and carry one piece of power backoff indicating information in the PHR, and then report the PHR to the eNB;

or, if it is detected that a power backoff occurs, then encapsulate the UE specific PH as one PHR separately, and carry one piece of power backoff indicating information in the PHR encapsulated with the UE specific PH, and then report the PHR to the eNB; or carry the power backoff indicating information with the LCID corresponding to the PHR, and report the power backoff indicating information along with the PHR to the eNB.

In the apparatus of the present invention, the UE is configured to encapsulate all or part of the PHs corresponding to the UL CC which need to be reported into an identical PHR in order according to the following way:

when encapsulating the PHR, one PH is carried by one byte in the PHR, comprising: taking the first 2 bits of one byte as reserved bits, and leaving the following 6 bits to carry one PH; or, taking every 6 bits of the PHR to carry one PH, and leaving 6 bits following said 6 bits to carry another PH.

In the apparatus of the present invention, the UE is further configured to take a plurality of bits in the first byte according to a preset order in the PHR to respectively indicate whether each UL CC configured by the UE reports the PH; or the UE is further configured to, when taking every 6 bits of the PHR carry one PH, further add several bits as PH identification bits among every 2 PHRs to indicate the UL CC to which each PH belongs.

In the apparatus of the present invention, the eNB is further configured to notify the UE to suspend or resume uploading of the virtual type2 PH through a RRC signaling; and the UE is further configured to suspend or resume the uploading of the virtual type2 PH according to the RRC signaling sent by the eNB.

In the apparatus of the present invention, the UE is further configured to judge whether each type2 PH to be reported is a negative number when uploading the PHR, if yes, not report the type2 PH.

In the apparatus of the present invention, the UE is further configured to, when uploading the PHR, encapsulate the type1 PH in the PHs corresponding to the UL CC which needs to be reported as one PHR and send to the eNB first, then, according to a preset priority, send data of which the priority is higher than that of the type2 PH to the eNB, and after that, if there are enough resources to report the type2 PH, then encapsulate the type2 PH in the PHs corresponding to the UL CC which needs to be reported as one PHR and send to the eNB.

In order to solve the above-mentioned technical problem, the present invention further provides a user equipment (UE), comprising a processing module and a calculation module, wherein:

the processing module is configured to, when reporting the PHR in a scenario where a physical uplink control channel (PUCCH) and a physical uplink shared channel (PUSCH) can be transmitted concurrently, if it is judged that no PUSCH is transmitted over an Uplink Primary Component Carrier (UL PCC) configured by the base station (eNB) for the UE, then control the calculation module to calculate a virtual type2 PH and/or a virtual type1 PH corresponding to the UL PCC, and then report the PH calculated by the calculation module to the base station (eNB); if it is judged that the PUSCH rather than PUCCH is transmitted over the UL PCC configured by the eNB for the UE, control the calculation module to calculate a type1 PH corresponding to the UL PCC or control the calculation module to calculate the virtual type2 PH and the type1 PH corresponding to the UL PCC, and then report the PH calculated by the calculation module to the base station (eNB);

the calculation module is configured to calculate PH corresponding to a Uplink Component Carrier (UL CC) under control of the processing module, wherein, the virtual type1 PH is a type1 PH calculated when taking a transmission power of the PUSCH channel in a reference format as the transmission power of the PUSCH channel if no PUSCH is transmitted; and the virtual type2 PH is a type2 PH calculated when taking the transmission power of the PUSCH channel in a reference format or the transmission power of the PUSCH channel with 0 power as the transmission power of the PUSCH channel if no PUSCH is transmitted, and/or, when taking the transmission power of the PUCCH channel in a reference format as the transmission power of the PUCCH channel if no PUCCH is transmitted.

In the user equipment of the present invention, the processing module is configured to control the calculation module to calculate the PH corresponding to the UL CC according to the following way: controlling the calculation module to calculate PHs corresponding to all configured UL CCs, or controlling the calculation module to calculate PHs corresponding to all activated UL CCs in the configured UL CCs, or controlling the calculation module to calculate all UL CCs with data scheduling in the configured UL CCs.

In the user equipment of the present invention, the processing module is further configured to encapsulate all or part of the PHs corresponding to the UL CC which need to be reported in an identical PHR in order, and carry one piece of mode indicating information in the PHR, and then report the PHR to the eNB; or carry the mode indicating information with a logical channel identifier (LCID) corresponding to the PHR, and report to the eNB the mode indicating information along with the PHR; wherein, the mode indicating information is used to indicate 3 modes of the PHR, wherein: in the first mode, the PHR comprises the type1 PH corresponding to the UL PCC and the type1 PH corresponding to the UL SCC; in the second mode, the PHR comprises the type1 PH and the type2 PH corresponding to the UL PCC, and the type1 PH corresponding to the UL SCC; in the third mode, the PHR comprises the type2 PH corresponding to the UL PCC, and the type1 PH corresponding to the UL SCC.

The present invention provides a method and apparatus for reporting a power headroom report (PHR) in a carrier aggregation scenario, which can provide the corresponding method for reporting the PHR regarding to various transmission scenarios effectively, and provide a basis for the eNB to better perform the uplink scheduling.

BRIEF DESCRIPTION OF DRAWINGS

FIG. 2 is a diagram 1 of a method for carrying PHR mode indicating information in a PHR according to an embodiment of the present invention;

FIG. 3 is a diagram 2 of a method for carrying PHR mode indicating information in a PHR according to an embodiment of the present invention;

FIG. 4 is a diagram 1 of a method for encapsulating a PH in a PHR according to an embodiment of the present invention; and FIG. 5 is a diagram 2 of a method for encapsulating a PH in a PHR according to an embodiment of the present invention.

PREFERRED EMBODIMENTS OF THE PRESENT INVENTION

Figure 1:
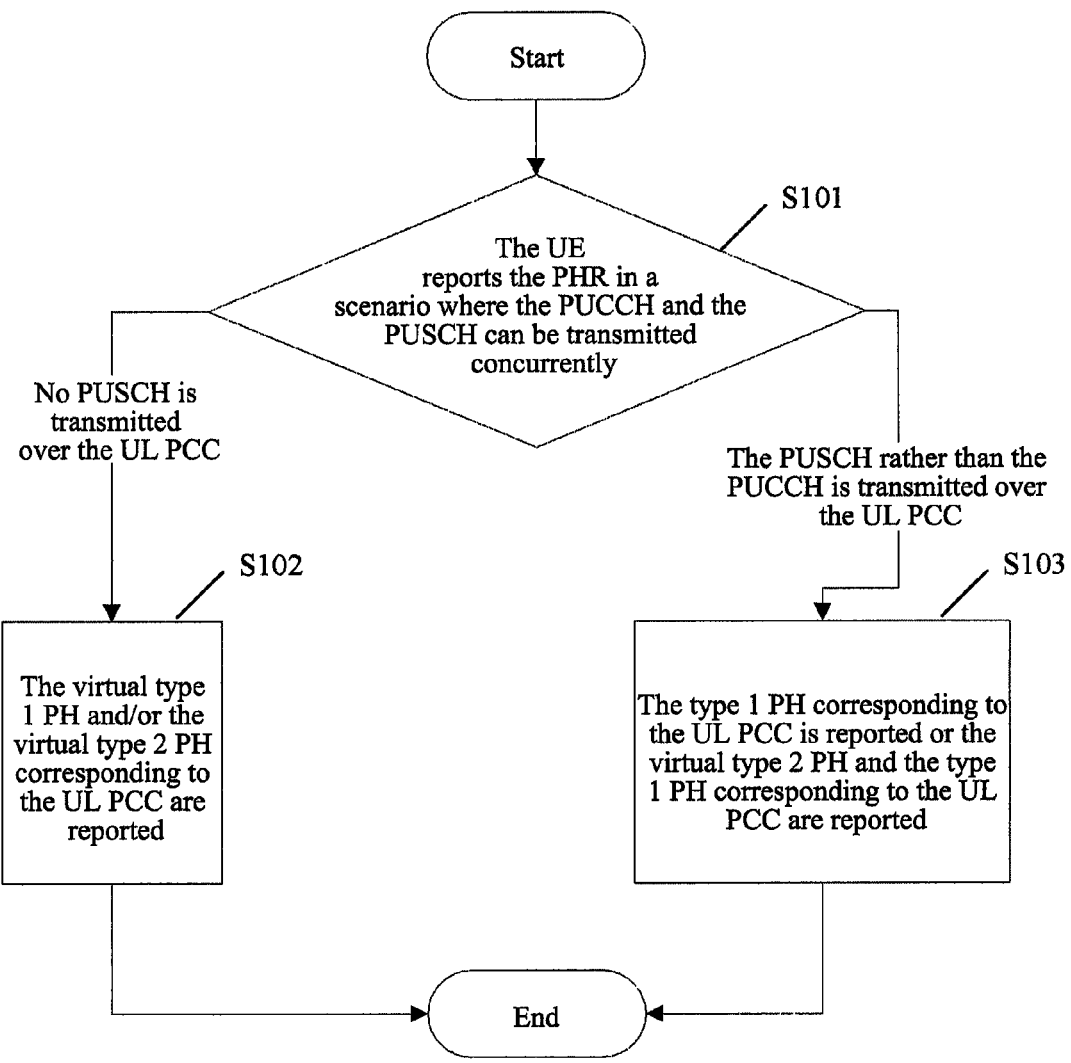
FIG. 1 is a flow chart of a method for reporting a power headroom report (PHR) in a carrier aggregation scenario according to an embodiment of the present invention.

In order to make the objective, technical scheme and advantage of the present invention more clear, the embodiment of the present invention will be illustrated in detail combining the accompanying drawings hereinafter. It needs to be illustrated that, in the case of no conflict, the embodiments in the present application and features in the embodiment can be combined with each other. In a certain Transmission Time Interval (TTI), not every UL CC has a newly transmitted uplink resource (UL-Grant) which can be used for calculating the PH. The embodiment of the present invention provides a method for reporting a PHR in a carrier aggregation scenario effectively with respect to a scenario where the PUSCH rather than the PUCCH needs to be transmitted over UL PCC (that is, no PUCCH is transmitted), or a scenario where the PUCCH rather than the PUSCH needs to be transmitted over UL PCC (that is, no PUSCH is transmitted), or a scenario where neither the PUCCH nor the PUSCH needs to be transmitted over UL PCC (that is, both PUCCH and PUSCH are not transmitted), which enables the eNB to learn the state of each CC in the UE completely.

First of all, the embodiment of the present invention proposes the concept of the Virtual Type1 PH and the virtual type2 PH on the basis of the type1 PH and the type2 PH:

(1) the virtual type1 PH is a type1 PH calculated when taking a transmission power of the PUSCH channel in a reference format as the transmission power of the PUSCH channel if no PUSCH is transmitted. Therefore, there is only one virtual type1 PHR, which is obtained from the construction of the PUSCH in the reference format, that is, the virtual type1 $PH: PH1 = PH_{pusch} = P_{cmaxc} - P_{ref\text{-}pusch}$ wherein, as to the UL PCC, $P_{cmaxc}$ is a maximum transmission power of the UL PCC, $P_{ref\text{-}punch}$ is a transmission power of the PUSCH channel in the reference format of the UL PCC; as to the UL SCC, $P_{cmaxc}$ is a maximum transmission power of the UL SCC, $P_{ref\text{-}pusch}$ is a transmission power of PUSCH channel in the reference format of the UL SCC.

(2) the virtual type2 PH is a type2 PH calculated when taking the transmission power of the PUSCH channel in a reference format or the transmission power of the PUSCH channel with 0 power as the transmission power of the PUSCH channel if no PUSCH is transmitted, and/or, taking the transmission power of the PUCCH channel in a reference format as the transmission power of the PUCCH channel if no PUCCH is transmitted. That is, the virtual type2 PH includes three kinds of situations, "the PUCCH rather than the PUSCH is transmitted", "the PUSCH rather than PUCCH transmission" and "neither PUSCH nor PUCCH is transmitted". Therefore, there are a plurality of types of the virtual Type2 PHR, which is constructed by PUSCH in the reference format or the PUSCH with 0 power, or constructed by the PUCCH in the reference format, specifically including a first virtual type2 PH, a second virtual type2 PH, a third virtual type2 PH, a fourth virtual type2 PH, and a fifth virtual type2 PH, wherein:

for the situation that the PUCCH rather than PUSCH is transmitted, it includes:

the first virtual type2 $PH: PH_{pusch+pucch} = P_{cmaxc} - P_{pucch} - P_{ref\text{-}pusch}$; and the second virtual type2 PH:

$$PH_{pusch+pucch} = P_{cmaxc} - P_{pucch} - P_{zero-pusch} = P_{cmaxc} - P_{pucch};$$

for the situation that the PUSCH rather than the PUCCH is transmitted, it includes:

the third virtual type2 $PH: PH_{pusch+pucch} = P_{cmaxc} - P_{ref\text{-}pucch} - P_{pusch}$;

for the situation that neither PUCCH nor PUSCH is transmitted, it includes:

the fourth virtual type2 $PH: PH_{pusch+pucch} = P_{cmaxc} - P_{ref\text{-}pucch} - P_{ref\text{-}pusch}$; and the fifth virtual type2 PH:

$$PH_{pusch+pucch} = P_{cmaxc} - P_{ref-pucch} - P_{zero-pusch} = P_{cmaxc} - P_{ref-pucch};$$

wherein, $P_{ref-pucch}$ refers to the transmission power of the PUCCH channel in the reference format. The $P_{ref-pusch}$ refers to the transmission power of the PUSCH in the reference format; the $P_{zero-pusch}$ refers to the transmission power of the PUSCH with 0 power, that is, the $P_{zero-pusch}$ is 0;

wherein, the reference format of the PUSCH can refer to the following formula:

$$P_{PUSCH}(i) = \{P_{cmax}, 10 \log_{10}(M_{PUSCH}(i)) + P_{O\_PUSCH}(j) + \alpha(j) \cdot PL + \Delta_{TF}(i) + f(i)\} \quad [dB]$$

for example, $\Delta_{TF}(i)=0$ is adopted, that is, delta MCS-Enabled provided by the high layer=0; $M_{PUSCH}(i)=1$, therefore, $10 \log_{10}(M_{PUSCH}(i))=0$.

wherein, the reference format of the PUCCH refers to the following formula:

$$P_{pucch}(i) = \{P_{cmax}, P_{0\_PUCCH} + h(n_{CQI}, n_{HARQ}) + \Delta_{F\_PUCCH}(F) + PL + g(i)\} \quad [dB]$$

for example, PUCCH format 1a is adopted, which makes $h(n_{CQI}, n_{HARQ})=0$, and $\Delta_{F\_PUCCH}(F)$ is the bit number of the PUCCH format 1a relative to the PUCCH format 1a, i.e. $10 \log_{10}(1/1)=0$, that is, $\Delta_{F\_PUCCH}(F)=0$.

The above definitions are all in the linear domain, and will not influence the present invention; if it is in view of logarithm domain [dB], the above-mentioned can be regarded as the format similar to $$PH_{pusch+pucch} = 10\log_{10}\left(\frac{P_{cmaxc}}{P_{pusch} + P_{pucch}}\right) \quad [dB]$$

respectively.

Based on the concepts of the virtual type1 PH and the virtual type2 PH, the embodiment of the present invention provides a method for reporting a PHR in a carrier aggregation scenario, as shown in FIG. 1, including the following steps:

step S101: when the UE reports the PHR in a scenario where the PUCCH and the PUSCH can be transmitted concurrently, if no PUSCH is transmitted over the UL PCC configured by the eNB for the UE, step S102 is executed; if a PUSCH rather than a PUCCH is transmitted over the Uplink Primary Component Carrier (UL PCC) configured by the eNB for the UE, step S103 is executed;

step S102: the virtual type1 PH and/or the virtual type2 PH corresponding to the UL PCC are reported, and the process ends;

step S103: the type1 PH corresponding to the UL PCC is reported or the virtual type2 PH and the type1 PH corresponding to the UL PCC are reported, and the process ends.

Combining several construction ways of the above-mentioned virtual type1 PH and the virtual type2 PH and the method shown in FIG. 1, several situations for uploading the PHR are illustrated specifically when the UE reports the PHR in the scenario where the PUCCH and the PUSCH can be transmitted concurrently:

situation (1): when both the PUSCH and the PUCCH are transmitted over the UL PCC configured by the eNB for the UE, the UE reports the type1 PH and the type2 PH corresponding to the UL PCC.

Situation (2): when the PUSCH transmission rather than PUCCH is transmitted over the UL PCC configured by the eNB for the UE, the UE can report the third virtual type2 PH and the type1 PH corresponding to the UL PCC; or, report the type1 PH corresponding to the UL PCC and not report the third virtual type2 PH.

Situation (3): when the PUCCH transmission rather than PUSCH is transmitted over the UL PCC configured by the eNB for the UE, the UE can report the first virtual type2 PH and the virtual type1 PH corresponding to the UL PCC; or, report the second virtual type2 PH and the virtual type1 PH corresponding to the UL PCC; or, report the second virtual type2 PH corresponding to the UL PCC and not report the virtual type1 PH; or, report the virtual type1 PH corresponding to the UL PCC and not report any virtual type2 PH.

Situation (4): when neither PUCCH transmission nor PUSCH is transmitted over the UL PCC configured by the eNB for the UE, the UE can report the fourth virtual type2 PH and the virtual type1 PH corresponding to the UL PCC; or, report the fifth virtual type2 PH and the virtual type1 PH corresponding to the UL PCC; or, report the fifth virtual type2 PH corresponding to the UL PCC and not report the virtual type1 PH corresponding to the UL PCC; or, report the virtual type1 PH corresponding to the UL PCC and not report any virtual type2 PH. In addition, in this case, the fourth virtual type2 PH corresponding to the UL PCC can also be reported and the virtual type1 PH corresponding to the UL PCC is not reported.

Preferably, in order to enable the eNB to understand the state of each CC in the UE completely, the embodiment of the present invention also reports the PH corresponding to the SCC without the newly transmitted UL-Grant, including: when the UE reports the PHR in the scenario wherein the PUCCH and the PUSCH can be transmitted concurrently, if no PUSCH is transmitted over an Uplink Secondary Component Carrier (UL SCC) configured by the eNB for the UE, then the virtual type1 PH corresponding to the UL SCC is reported.

In addition, the applicant finds, through observing carefully and investigating thoroughly, that the format of the PH does not change generally after the PHR is configured, while the activated or deactivate command does not relate to the Radio Resource Control (RRC) signaling and the configuration can not be modified. And in order to enable the eNB to understand the state of each CC in the UE completely, preferably, in the embodiment of the present invention, the UE can also report PHs corresponding to all Uplink Component Carriers (UL CC) configured by the eNB for the UE, or report PHs corresponding to all activated UL CCs in the UL CCs configured by the eNB for the UE, or report all UL CCs with data scheduling in the UL CCs configured by the eNB for the UE. If the UE detects that there is an uplink resource allocation signaling (grant) on the PDCCH, then it is considered that there is the data scheduling.

As to the PH corresponding to a plurality of UL CCs, in order to save the transmission resource, preferably, the UE can encapsulate all or part of the PHs corresponding to the UL CC which need to be reported in an identical PHR in order, and carry one piece of mode indicating information in the PHR, and then report the PHR to the eNB. For example, as shown in FIG. 2, the UE can take the first and second bits in the PHR as the type indication to carry the mode indicating information, for example, the first mode is represented by 00, the second mode is represented by 01, and the third mode is represented by 10. Or, the mode indicating information can be carried with a logical channel identifier (LCID) corresponding to the PHR (as shown in FIG. 3), and is reported to the eNB along with the PHR.

Wherein, the mode indicating information is used to indicate 3 modes of the PHR, wherein: in the first mode, the PHR includes the type1 PH corresponding to the UL PCC and the type1 PH corresponding to the UL SCC; in the second mode, the PHR includes the type2 PH and the type1 PH corresponding to the UL PCC and the type1 PH corresponding to the UL SCC; in the third mode, the PHR includes the type2 PH corresponding to the UL PCC, and the type1 PH corresponding to the UL SCC.

In this way, after the eNB receives the PHR, according to the judgment for the type identifier, it can be known whether the type2 PH is sent, thus it can be determined quickly how to perform the uplink transmission adjustment on the UE.

When the UE encapsulates the PHR, one PH can be carried by one byte in the PHR, including: taking the first 2 bits of one byte as reserved bits, and leaving the following 6 bits to carry one PH, as shown in FIG. 4. Or, every 6 bits of the PHR can be used to carry one PH, and 6 bits following said 6 bits are used to carry another PH, as shown in FIG. 5.

The encapsulation order of the PH can be that, all type1 PHs are sorted according to the CC identifier, all type2 PHs are sorted according to the CC identifier, the last one of all the type1 PHs is before the first one of the type2 PHs, or the last one of the type2 PHs is before the first one of the type1 PHs. The encapsulation order of the PH also can be that, the PHs corresponding to each UL CC are sorted according to the CC identifier, and for the PH corresponding to the same UL CC, the type1 PHs are before or after the type2 PHs.

In order to indicate the UL CC to which the PH encapsulated in the PHR belongs clearly, the UE takes a plurality of bits in the first byte according to a preset order in the PHR to respectively indicates whether each UL CC configured by the UE reports the PH; or the UE, when taking every 6 bits of the PHR to carry one PH, further adds several bits as PH identification bits among every 2 PHRs to indicate the UL CC to which each PH belongs.

In view of when the power backoff occurs, that is, the calculated power value when the UE reports the PHR is greater than its real transmission power value, and when the power enters the non-linearity region, the eNB cannot acquire the state of each UL CC in the UE completely, so, in the embodiment of the present invention, when the power backoff occurs, it still reports the UE specific PH, including:

when the UE reports the PHR, if it is detected that a power backoff occurs, further encapsulating the UE specific PH in the PHR, and carrying one piece of power backoff indicating information in the PHR, and then reporting the PHR to the eNB;

or, if it is detected that a power backoff occurs, encapsulating the UE specific PH as one PHR independently, and carrying one piece of power backoff indicating information in the PHR encapsulated with the UE specific PH, and then reporting the PHR to the eNB; or carrying the power backoff indicating information with the LCID corresponding to the PHR, and reporting the power backoff indicating information along with the PHR to the eNB.

In the embodiment of the present invention, the eNB further can notify the UE to suspend or resume the uploading of the virtual type2 PH through a RRC signaling. The UE also suspends or resumes the uploading the virtual type2 PH according to the RRC signaling sent by the eNB. Thereby the ability for controlling the reporting procedure is increased.

Preferably, in the embodiment of the present invention, the UE further judges whether each type2 PH to be reported is a negative number when uploading the PHR, if yes, then it does not report that type2 PH.

In view of when there is no type2 PHR, the eNB can select not to perform the PUCCH+PUSCH scheduling, which will not influence the transmission by the UE seriously. In order to guarantee the important data is transmitted in a high priority, a priority can be set up. When the UE uploads the PHR, it encapsulates the type1 PH in the PHs corresponding to the UL CC which needs to be reported as one PHR and sends to the eNB first, then, according to a preset priority, sends data of which the priority is higher than that of the type2 PH to the eNB, and later if it can still report the type2 PH, then encapsulates the type2 PH in the PHs corresponding to the UL CC which needs to be reported as one PHR and sends to the eNB.

In order to realize the above-mentioned method, the embodiment of the present invention further provides an apparatus for reporting a power headroom report (PHR) in a carrier aggregation scenario, including a user equipment (UE) and a base station (eNB), wherein:

the UE is configured to, when reporting the PHR in a scenario where a physical uplink control channel (PUCCH) and a physical uplink shared channel (PUSCH) can be transmitted concurrently, if no PUSCH is transmitted over an Uplink Primary Component Carrier (UL PCC) configured by the base station (eNB) for the UE, report a virtual type2 PH and/or a virtual type1 PH corresponding to the UL PCC;

if a PUSCH rather than a PUCCH is transmitted over the UL PCC configured by the eNB for the UE, report a type1 PH corresponding to the UL PCC or report the virtual type2 PH and the type1 PH corresponding to the UL PCC; wherein, the virtual type1 PH is a type1 PH calculated when taking a transmission power of the PUSCH channel in a reference format as the transmission power of the PUSCH channel if no PUSCH is transmitted; and the virtual type2 PH is a type2 PH calculated when taking the transmission power of the PUSCH channel in a reference format or the transmission power of the PUSCH channel with 0 power as the transmission power of the PUSCH channel if no PUSCH is transmitted, and/or, taking the transmission power of the PUCCH channel in a reference format as the transmission power of the PUCCH channel if no PUCCH is transmitted.

In the present embodiment, when the UE reports the PHR in the scenario where the PUCCH and PUSCH can be transmitted concurrently, if no PUSCH is transmitted over the Uplink Secondary Component Carrier (UL SCC) configured by the eNB for the UE, then the UE reports a virtual type1 PH corresponding to the UL SCC.

In the present embodiment, the PHR reported by the UE includes PHs corresponding to all Uplink Component Carriers (UL CC) configured by the eNB for the UE, or PHs corresponding to all activated UL CCs in the UL CCs configured by the eNB for the UE are reported, or all UL CCs with data scheduling in the UL CCs configured by the eNB for the UE are reported.

In the present embodiment, the UE encapsulates all or part of the PHs corresponding to the UL CC which need to be reported into an identical PHR in order, and carries one piece of mode indicating information in the PHR, and then reports the PHR to the eNB; or carries the mode indicating information with a logical channel identifier (LCID) corresponding to the PHR, and reports the mode indicating information to the eNB along with the PHR. The mode indicating information is used to indicate 3 modes of the PHR, wherein: in the first mode, the PHR comprises the type1 PH corresponding to the UL PCC and the type1 PH corresponding to the UL SCC; in the second mode, the PHR comprises the type2 PH and the type1 PH corresponding to the UL PCC, and the type1 PH corresponding to the UL SCC; in the third mode, the PHR comprises the type2 PH corresponding to the UL PCC, and the type1 PH corresponding to the UL SCC.

In the present embodiment, when reporting the PHR, if it is detected that a power backoff occurs, the UE further encapsulates the UE specific PH in the PHR, and carries one piece of power backoff indicating information in the PHR, and then reports the PHR to the eNB. Or, if it is detected that a power backoff occurs, then it encapsulates the UE specific PH as one PHR separately, and carries one piece of power backoff indicating information in the PHR encapsulated with the UE specific PH, and then reports the PHR to the eNB; or carries the power backoff indicating information with the LCID corresponding to the PHR, and reports the power backoff indicating information along with the PHR to the eNB.

In the present embodiment, when the UE encapsulates the PHR, one PH is carried by one byte in the PHR, including: taking the first 2 bits of one byte as reserved bits, and leaving the following 6 bits to carry one PH; or, taking every 6 bits of the PHR to carry one PH, and leaving 6 bits following said 6 bits to carry another PH.

In the present embodiment, the UE takes a plurality of bits in the first byte according to a preset order in the PHR to respectively indicate whether each UL CC configured by the UE reports the PH; or the UE, when taking every 6 bits of the PHR to carry one PH, further adds several bits as PH identification bits among every 2 PHRs to indicate the UL CC to which each PH belongs.

In the present embodiment, the eNB further notifies the UE to suspend or resume the uploading of the virtual type2 PH through a RRC signaling; and the UE further suspends or resumes the uploading of the virtual type2 PH according to the RRC signaling sent by the eNB.

In the present embodiment, the UE further judges whether each type2 PH to be reported is a negative number when uploading the PHR, and if yes, it does not report the type2 PH.

In the present embodiment, the UE, when uploading the PHR, encapsulates the type1 PH in the PHs corresponding to the UL CC which needs to be reported as a PHR and sends to the eNB first, then, according to a preset priority, sends data of which the priority is higher than that of the type2 PH to the eNB, and after that, if there are still enough resources to report the type2 PH, encapsulates the type2 PH in the PHs corresponding to the UL CC which needs to be reported as a PHR and sends to the eNB.

In order to realize the above-mentioned method, the embodiment of the present invention further provides a user equipment (UE), used to report a power headroom report (PHR) in a carrier aggregation scenario, and the UE includes a processing module and a calculation module, wherein:

the processing module is configured to control the calculation module to calculate the PH corresponding to the ULCC, including: when reporting the PHR in a scenario where a physical uplink control channel (PUCCH) and a physical uplink shared channel (PUSCH) can be transmitted concurrently, if it is judged that no PUSCH is transmitted over an Uplink Primary Component Carrier (UL PCC) configured by the base station (eNB) for the UE, then controlling the calculation module to calculate a virtual type1 PH and/or a virtual type2 PH corresponding to the UL PCC, and then reporting the PH(s) calculated by the calculation module to the eNB; if it is judged that a PUSCH rather than a PUCCH is transmitted over the Uplink Primary Component Carrier (UL PCC) configured by the eNB for the UE, then controlling the calculation module to calculate a type1 PH corresponding to the UL PCC or controlling the calculation module to calculate the virtual type2 PH and the type1 PH corresponding to the UL PCC, and then reporting the PH calculated by the calculation module to the base station (eNB);

the calculation module is configured to calculate PH corresponding to a Uplink Component Carrier (UL CC) under the control of the processing module, wherein, the virtual type1 PH is a type1 PH calculated when taking a transmission power of the PUSCH channel in a reference format as the transmission power of the PUSCH channel if no PUSCH is transmitted; and the virtual type2 PH is a type2 PH calculated when taking the transmission power of the PUSCH channel in a reference format or the transmission power of the PUSCH channel with 0 power as the transmission power of the PUSCH channel if no PUSCH is transmitted, and/or, taking the transmission power of the PUCCH channel in a reference format as the transmission power of the PUCCH channel if no PUCCH is transmitted.

In the present embodiment, the processing module is configured to control the calculation module to calculate PHs corresponding to all configured UL CCs, or control the calculation module to calculate PHs corresponding to all activated UL CCs in the configured UL CCs, or control the calculation module to calculate all UL CCs with data scheduling in the configured UL CCs.

In the present embodiment, the processing module is further configured to report the PH calculated by the calculation module to the eNB according to the following way: encapsulating all or part of the PHs corresponding to the UL CC which need to be reported into an identical PHR in order, and carrying one piece of mode indicating information in the PHR, and then reporting the PHR to the eNB; or carrying the mode indicating information with a logical channel identifier (LCID) corresponding to the PHR, and reporting to the eNB the mode indicating information along with the PHR;

the mode indicating information is used to indicate 3 modes of the PHR, wherein: in the first mode, the PHR comprises the type1 PH corresponding to the UL PCC and the type1 PH corresponding to the UL SCC; in the second mode, the PHR comprises the type2 PH and the type1 PH corresponding to the UL PCC, and the type1 PH corresponding to the UL SCC; in the third mode, the PHR comprises the type2 PH corresponding to the UL PCC, and the type1 PH corresponding to the UL SCC.

In order to further illustrate that, by adopting the above-mentioned method for reporting the PHR in the embodiment of the present invention, it can provide the corresponding method for reporting the PHR for various transmission scenarios and provide basis for the eNB to better perform the power control effectively regarding to the UE reporting the PHR in a scenario where a physical uplink control channel (PUCCH) and a physical uplink shared channel (PUSCH) can be transmitted concurrently, it is illustrated in detail by using several application examples hereinafter.

Application Example 1

The scenario that the UE only supports the Type1 PH:

In the scenario, as for the LCID, the PHR Media Access Control Control Element (MAC CE) logical channel identifier (LCID) 1 of the Rel-8/Rel-9 is adopted.

Step 1: when the UE specific periodical PHR-timer expires, or when the UE-specific prohibit PHR-timer expires or has already expired, when the pathloss change of any one UL CC is greater than the pathloss change threshold value (dl-pathloss change) of the UE specific downlink, and when the PHR function is configured or reconfigured through the RRC signaling, the PHR is triggered, and step 2 is executed;

step 2: in a certain subframe, the eNB allocates the uplink resource (UL resource) used for newly transmitting to the UE, and when any UL CC obtains a new UL resource, the UE will try to report the PHR to the eNB, and step 3 is executed;

step 3: if since MAC has been reset last time, the UE obtains the UL resource for the first time, then the UE will start the periodic PHR-Timer, and when the timer expires, the PHR is triggered, and step 4 is executed;

step 4: if at least one PHR is triggered since the PHR has been sent last time or the PHR is triggered for the first time, and the UL resources, after LCP, are enough to carry the PHR MAC CE and its MAC subheader, step 5 is executed;

step 5: the PH information of each CC is obtained from the physical layer, and the PHR MAC CE is constructed, to send the PHR of the first mode; if the PUSCH of a certain CC is not sent, then the virtual type1 PHR is sent. The PHR is multiplexed to MAC PDU and sent to the physical layer for transmitting, the periodic PHR-Timer and the prohibit PHR-Timer are started or restarted, all triggered PHRs are cancelled, and the process ends.

Application Example 2

The UE supports the joint transmission mode 1 of the PUSCH and the PUCCH: the UE will send the type1 and type2 PHR all the time. As for the first mode PHR LCID, the PHR MAC CE LCID 1 of the Rel-8/Rel-9/Rel-10 is adopted, the second mode PHR LCID is newly-added as the PHR MAC CE LCID2 of the Rel-10 and the third mode PHR LCID is newly-added as the PHR MAC CE LCID3 of the Rel-10. In the joint transmission mode, the UE will send a complete PH, including the type1 PH and the type2 PH of the UL PCC, and the type1 PH of the UL SCC.

Step 1: when the UE-specific periodical PHR-timer expires, or when the UE-specific prohibit PHR-timer expires or has already expired, when the pathloss change of any one UL CC is greater than the UE-specific dl-pathloss change, and when the PHR function is configured or reconfigured through the RRC signaling, the PHR of the second mode is triggered, that is to say, the type1 PH and the type2 PH of the UL PCC need to be sent, and step 2 is executed;

step 2: in a certain subframe, the eNB allocates the UL resource used for newly transmitting to the UE, and when any UL CC obtains a new UL resource, the UE will try to report the PHR to the eNB, and step 3 is executed;

step 3: if since the MAC has been reset last time, the UE obtains the UL resource for the first time, then the UE will start the periodic PHR-Timer, and when the timer expires, step 4 is executed;

step 4: if at least one PHR is triggered since the PHR has been sent last time or the PHR is triggered for the first time, and the UL resources, after LCP, are enough to carry the PHR MAC CE and its MAC subheader, step 5 is executed;

step 5: the PH information of each CC is obtained from the physical layer, and the PHR MAC CE is constructed according to the triggered type to send the PHR of the second mode; the PHR is multiplexed to MAC PDU and sent to the physical layer for transmitting, the periodic PHR-Timer and the prohibit PHR-Timer are started or restarted, all triggered PHRs are cancelled, and the process ends.

Application Example 3

The UE supports the joint transmission mode 2 of the PUSCH and the PUCCH: the pathloss trigger triggers the transmission of the type2 PH, and the periodical trigger triggers the transmission of the type1 PH.

In the application example, as for the first mode PHR LCID, the PHR MAC CE LCID 1 of the Rel-8/Rel-9/Rel-10 is adopted, the second mode PHR LCID is newly-added as the PHR MAC CE LCID2 of the Rel-10 and the third mode PHR LCID is newly-added as the PHR MAC CE LCID3 of the Rel-10.

Step 1: when the UE specific periodical PHR-timer expires, the PHR of the first mode is triggered; or when the UE specific prohibit PHR-timer expires or has already expired, when the pathloss change of any one UL CC is greater than the UE specific dl-pathloss change, and when the PHR function is configured or reconfigured through the RRC signaling, the PHR of the second mode or the PHR of the third mode is triggered, and step 2 is executed;

step 2: in a certain subframe, the eNB allocates the UL resource used for newly transmitting to the UE, and when any UL CC obtains a new UL resource, the UE will try to report the PHR to the eNB, and step 3 is executed;

step 3: if since the MAC has been reset last time, the UE obtains the UL resource for the first time, then the UE will start the periodic PHR-Timer, and when the timer expires, step 4 is executed;

step 4: if at least one PHR is triggered since the PHR has been sent last time or the PHR is triggered for the first time, and the UL resources, after LCP, are enough to carry the PHR MAC CE and its MAC subheader, step 5 is executed;

step 5: the PH information of each CC is obtained from the physical layer, and the PHR MAC CE is constructed according to the triggered type, to send the PHR of the first mode, the PHR of the second mode or the PHR of the third mode; the PHR is multiplexed to MAC PDU and sent to the physical layer for transmitting, the periodic PHR-Timer and the prohibit PHR-Timer are started or restarted, all triggered PHRs are cancelled, and the process ends.

Application Example 4

The logic channel prioritizes the PHRs with the priorities. The type2 PHR is a kind of optimized PHR, that is, more flexibility of the scheduling is provided to the eNB; when there is no type2 PHR, the eNB can select not to perform the PUCCH+PUSCH scheduling, and will not influence the transmission of the UE seriously. The priority of the PHR in the existing UL MUX is as follows, and it can be considered that the priority of the type2 PHR is lower than that of the data or padding BSR.

Step 1: when the UE-specific periodical PHR-timer expires, the PHR of the first mode is triggered; or when the UE-specific prohibit PHR-timer expires or has expired, when the pathloss change of any one UL CC is greater than the UE-specific dl-pathloss change, and when the PHR function is configured or reconfigured through the RRC signaling, the PHR is triggered, and step 2 is executed;

step 2: in a certain subframe, the eNB allocates the UL resource used for newly transmitting to the UE, and when any UL CC obtains a new UL resource, the UE will try to report the PHR to the eNB, and step 3 is executed;

step 3: if since the MAC has been reset last time, the UE obtains the UL resource for the first time, then the UE will start the periodic PHR-Timer, and when the timer expires, step 4 is executed;

step 4: if at least one PHR is triggered since the PHR has been sent last time or the PHR is triggered for the first time, via the logic channel prioritization process, the UL resources, after the LCP, are enough to carry the type1 PH of all ULCCs and its MAC subheader, i.e., the PHR of the first mode, then the PH of the first mode is sent; if, after the logic channel prioritization process, the UL resources, after the LCP, are still enough to carry the type2 PH and its MAC subheader, then the type2 PH of the UL PCC and its MAC subheader are sent; and step 5 is executed;

step 5: according to the result of the logic channel prioritization, the type1 PH and type2 PH information of each CC is obtained from the physical layer to construct the PHR MAC CE, so as to send the PHR of the first mode, the PHR of the second mode or the PHR of the third mode; the PHR is multiplexed to MAC PDU and sent to the physical layer for transmitting, the periodic PHR-Timer and the prohibit PHR-Timer are started or restarted, all triggered PHRs are cancelled, and the process ends.

Application Example 5

The transmission of the virtual type2 PHR of the UE is controlled through the eNB.

Step 1: if the eNB notifies the UE to suspend the transmission of the virtual type2 PH through the RRC signaling, it is to jump to step 2; if the eNB notifies the UE to resume the transmission of the virtual type2 through the RRC signaling, it is to jump to step 3;

step 2: after the UE receives the RRC signaling, the transmission of the virtual type2 PHR is suspended;

step 3: after the UE receives the RRC signaling, the transmission of the virtual type2 PHR is resumed.

Application Example 6

The transmission of the virtual type2 PHR is selected through the UE independently.

Step 1: if the type2 PH value calculated by the UE is negative, then the UE can suspend the transmission of the type2 PH, that is to say, the UE does not send the type2 PH in the mode where the type2 PH can be sent, and adopts the model 1;

step 2: after the eNB receives the PHR, according to the judgment by the LCID or a special identifier, it is known that the type2 PH is not sent, as a result, the uplink transmission by the UE will be adjusted, for example, the UE is notified to adopt the way of the embodiment 1 through the RRC signaling;

step 3: if the type1 PH value calculated by the UE has a greater allowance, then the UE can start the transmission of the type2 PH, that is to say, it can adopt the way of embodiment 2, and the PHR of the second mode is sent;

step 4: after the eNB receives the PHR, according to the judgment by the LCID or the special identifier, it is known that the type2 PH is sent, as a result, the uplink transmission by the UE is adjusted and the scheduling way of the second modal will be adopted.

Application Example 7

The UE reports the PHs corresponding to all the UL CCs with the data scheduling in the scenario where the physical uplink control channel (PUCCH) and the physical uplink shared channel (PUSCH) can be transmitted concurrently.

At this moment, if both the PUCCH and the PUSCH are transmitted over the UL PCC, then the type1 PH and the type2 PH corresponding to the UL PCC are sent. If there is only the PUSCH transmitted, then the type1 PH and the virtual type2 PH corresponding to the UL PCC are sent.

Application Example 8

The UE reports the PHs corresponding to all the UL CCs with the data scheduling in the scenario where the physical uplink control channel (PUCCH) and the physical uplink shared channel (PUSCH) can be transmitted concurrently.

At this moment, if both the PUCCH and the PUSCH are transmitted over the UL PCC, then the type1 PH and the type2 PH corresponding to the UL PCC are sent. If there is only the PUSCH transmitted, then only the type1. PH corresponding to the UL PCC is sent, and the virtual type2 PH corresponding to the UL PCC is not sent.

It can be understood by those skilled in the art that all or part of steps in the above-mentioned method can be fulfilled by programs instructing the relevant hardware, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module unit in the above-mentioned embodiments can be implemented in the form of hardware, or in the form of software function module. The present invention is not limit to any specific form of the combination of the hardware and software.

Obviously, the present invention can have a variety of other embodiments. Those skilled in the art can make the corresponding modifications and variations according to the present invention without departing from the spirit and essence of the present invention. And all of these modifications, equivalents or the variations made within the spirit and essence of the present invention should be embodied in the scope of the appending claims of the present invention.

INDUSTRIAL APPLICABILITY

The present invention provides a method and apparatus for reporting a power headroom report (PHR) in a carrier aggregation scenario, which can provide the corresponding method for reporting the PHR regarding to various transmission scenarios effectively, and provide a basis for the eNB to better perform the uplink scheduling.

What we claim is:

1. A method for reporting a power headroom report PHR in a carrier aggregation scenario, comprising:

when a user equipment UE reports the PHR in a scenario where a physical uplink control channel PUCCH and a physical uplink shared channel PUSCH can be transmitted concurrently, if no the PUSCH is transmitted over an Uplink Primary Component Carrier (UL PCC) configured by a base station eNB for the UE, the UE reporting at least one of a virtual type1 PH and a virtual type2 PH corresponding to the UL PCC; if the PUSCH rather than the PUCCH is transmitted over the UL PCC configured by the eNB for the UE, the UE reporting the type1 PH corresponding to the UL PCC or reporting the virtual type2 PH and the type1 PH corresponding to the UL PCC; wherein, the virtual type1 PH is the type1 PH calculated when taking a transmission power of the PUSCH channel in a reference format as the transmission power of the PUSCH channel if no the PUSCH is transmitted; and the virtual type2 PH is a type2 PH calculated when taking the transmission power of the PUSCH channel in the reference format or the transmission power of the PUSCH channel with 0 power as the transmission power of the PUSCH channel if no the PUSCH is transmitted; and/or, when taking the transmission power of the PUCCH channel in a reference format as the transmission power of the PUCCH channel if no the PUCCH is transmitted.

2. The method according to claim 1, further comprising:
when the UE reports the PHR in the scenario where the PUCCH and PUSCH can be transmitted concurrently, if no PUSCH is transmitted over the Uplink Secondary Component Carrier (UL SCC) configured by the eNB for the UE, the UE reporting a virtual type1 PH corresponding to the UL SCC.

3. The method according to claim 1, wherein:
the PHR reported by the UE comprises PHs corresponding to all Uplink Component Carriers (UL CC) configured by the eNB for the UE, or PHs corresponding to all activated UL CCs in the UL CCs configured by the eNB for the UE are reported, or all UL CCs with data scheduling in the UL CCs configured by the eNB for the UE are reported.

4. The method according to claim 1, further comprising:
the UE encapsulating all or part of the PHs corresponding to the UL CC which need to be reported in an identical PHR in order, and carrying one piece of mode indicating information in the PHR, and then reporting the PHR to the eNB; or carrying the mode indicating information with a logical channel identifier (LCID) corresponding to the PHR, and reporting the mode indicating information to the eNB along with the PHR; wherein,
the mode indicating information is used to indicate 3 modes of the PHR, wherein, in a first mode, the PHR comprises the type1 PH corresponding to the UL PCC and the type1 PH corresponding to the UL SCC; in a second mode, the PHR comprises the type1 PH and the type2 PH corresponding to the UL PCC, and the type1 PH corresponding to the UL SCC; in a third mode, the PHR comprises the type2 PH corresponding to the UL PCC, and the type1 PH corresponding to the UL SCC.

5. The method according to claim 4, further comprising:
when the UE reports the PHR, if it is detected that a power backoff occurs, further encapsulating a UE specific PH in the PHR, and carrying one piece of power backoff indicating information in the PHR, and then reporting the PHR to the eNB;
or, if it is detected that a power backoff occurs, encapsulating the UE specific PH as a PHR separately, and carrying one piece of power backoff indicating information in the PHR encapsulated with the UE specific PH, and then reporting the PHR to the eNB; or carrying the power backoff indicating information with the LCID corresponding to the PHR, and reporting the power backoff indicating information along with the PHR to the eNB.

6. The method according to claim 4, wherein:
in the step of the UE encapsulating all or part of the PHs corresponding to the UL CC which need to be reported in an identical PHR in order, when the UE encapsulates the PHR, one PH is carried by one byte in the PHR, comprising: taking first 2 bits of one byte as reserved bits, and leaving following 6 bits to carry one PH;
or, taking every 6 bits of the PHR to carry one PH, and leaving 6 bits following said 6 bits to carry another PH.

7. The method according to claim 6, wherein:
the UE takes a plurality of bits in a first byte according to a preset order in the PHR to respectively indicate whether each UL CC configured by the UE reports the PH; or
the UE, when taking every 6 bits of the PHR to carry one PH, further adds several bits as PH identification bits among every 2 PHRs to indicate a UL CC to which each PH belongs.

8. An apparatus for reporting a power headroom report PHR in a carrier aggregation scenario, comprising a user equipment UE and a base station eNB, wherein:
the UE is configured to, when reporting the PHR in a scenario where a physical uplink control channel PUCCH and a physical uplink shared channel PUSCH can be transmitted concurrently, if no the PUSCH is transmitted over an Uplink Primary Component Carrier (UL PCC) configured by the base station eNB for the UE, report at least one of a virtual type1 PH and a virtual type2 PH corresponding to the UL PCC; if the PUSCH rather than the PUCCH is transmitted over the UL PCC configured by the eNB for the UE, report the type1 PH corresponding to the UL PCC or report the virtual type2 PH and the type1 PH corresponding to the UL PCC; wherein,
the virtual type2 PH is the type1 PH calculated when taking a transmission power of the PUSCH channel in a reference format as the transmission power of the PUSCH channel if no the PUSCH is transmitted; and
the virtual type2 PH is the type2 PH calculated when taking the transmission power of the PUSCH channel in the reference format or the transmission power of the PUSCH channel with 0 power as the transmission power of the PUSCH channel if no the PUSCH is transmitted, and/or, when taking the transmission power of the PUCCH channel in a reference format as the transmission power of the PUCCH channel if no the PUCCH is transmitted.

9. The apparatus according to claim 8, wherein:
the UE is further configured to, when reporting the PHR in the scenario where the PUCCH and PUSCH can be transmitted concurrently, if no PUSCH is transmitted over the Uplink Secondary Component Carrier (UL SCC) configured by the eNB for the UE, report a virtual type1 PH corresponding to the UL SCC.

10. The apparatus according to claim 8, wherein:
the PHR reported by the UE comprises PHs corresponding to all Uplink Component Carriers (UL CC) configured by the eNB for the UE, or PHs corresponding to all activated UL CCs in the UL CCs configured by the eNB for the UE are reported, or all UL CCs with data scheduling in the UL CCs configured by the eNB for the UE are reported.

11. The apparatus according to claim 8, wherein:
the UE is further configured to encapsulate all or part of the PHs corresponding to the UL CC which need to be reported in an identical PHR in order, and carry one piece of mode indicating information in the PHR, and then report the PHR to the eNB; or carry the mode indicating information with a logical channel identifier (LCID) corresponding to the PHR, and report to the eNB the mode indicating information along with the PHR; wherein,
the mode indicating information is used to indicate 3 modes of the PHR, wherein, in a first mode, the PHR comprises the type1 PH corresponding to the UL PCC and the type1 PH corresponding to the UL SCC; in a second mode, the PHR comprises the type1 PH and the type2 PH corresponding to the UL PCC, and the type1 PH corresponding to the UL SCC; in a third mode, the PHR comprises the type2 PH corresponding to the UL PCC, and the type1 PH corresponding to the UL SCC.

12. The apparatus according to claim 11, wherein:
the UE is further configured to, when reporting the PHR, if it is detected that a power backoff occurs, further encapsulate a UE specific PH in the PHR, and carry one piece of power backoff indicating information in the PHR, and then report the PHR to the eNB;

or, if it is detected that a power backoff occurs, then encapsulate the UE specific PH as one PHR separately, and carry one piece of power backoff indicating information in the PHR encapsulated with the UE specific PH, and then report the PHR to the eNB; or carry the power backoff indicating information with the LCID corresponding to the PHR, and report the power backoff indicating information along with the PHR to the eNB.

13. The apparatus according to claim 11, wherein:
the UE is configured to encapsulate all or part of the PHs corresponding to the UL CC which need to be reported in an identical PHR in order according to a following way:
when encapsulating the PHR, one PH is carried by one byte in the PHR, comprising: taking first 2 bits of one byte as reserved bits, and leaving following 6 bits to carry one PH;
or, taking every 6 bits of the PHR to carry one PH, and leaving 6 bits following said 6 bits to carry another PH.

14. The apparatus according to claim 13, wherein:
the UE is further configured to take a plurality of bits in a first byte according to a preset order in the PHR to respectively indicate whether each UL CC configured by the UE reports the PH; or
the UE is further configured to, when taking every 6 bits of the PHR to carry one PH, further add several bits as PH identification bits among every 2 PHRs to indicate a UL CC to which each PH belongs.

15. The apparatus according to claim 8, wherein:
the eNB is further configured to notify the UE to suspend or resume uploading of the virtual type2 PH through a RRC signaling; and
the UE is further configured to suspend or resume the uploading of the virtual type2 PH according to the RRC signaling sent by the eNB.

16. The apparatus according to claim 8, wherein:
the UE is further configured to judge whether each type2 PH to be reported is a negative number when uploading the PHR, and if yes, not report the type2 PH.

17. The apparatus according to claim 8, wherein:
the UE is further configured to, when uploading the PHR, first, encapsulate the type1 PH in the PHs corresponding to the UL CC which needs to be reported as a PHR and send to the eNB, then, according to a preset priority, send data of which the priority is higher than that of the type2 PH to the eNB, and after that, if there still are enough resources to report the type2 PH, then encapsulate the type2 PH in the PHs corresponding to the UL CC which needs to be reported as a PHR and send to the eNB.

18. A user equipment UE, comprising a processing module and a calculation module, wherein:
the processing module is configured to, when reporting a PHR in a scenario where a physical uplink control channel PUCCH and a physical uplink shared channel PUSCH can be transmitted concurrently, if it is judged that no the PUSCH is transmitted over an Uplink Primary Component Carrier (UL PCC) configured by a base station eNB for the UE, control the calculation module to calculate at least one of a virtual type1 PH and a virtual type2 PH corresponding to the UL PCC, and then report a PH calculated by the calculation module to the base station eNB; if it is judged that PUSCH rather than the PUCCH is transmitted over the UL PCC configured by the eNB for the UE, then control the calculation module to calculate the type1 PH corresponding to the UL PCC or control the calculation module to calculate the virtual type2 PH and the type1 PH corresponding to the UL PCC, and then report the PH calculated by the calculation module to the base station eNB;
the calculation module is configured to calculate the PH corresponding to a Uplink Component Carrier (UL CC) under a control of the processing module, wherein,
the virtual type1 PH is the type1 PH calculated when taking a transmission power of the PUSCH channel in the reference format as the transmission power of the PUSCH channel if no the PUSCH is transmitted; and
the virtual type2 PH is the type2 PH calculated when taking the transmission power of the PUSCH channel in the reference format or the transmission power of the PUSCH channel with 0power as the transmission power of the PUSCH channel if no the PUSCH is transmitted, or, when taking the transmission power of the PUCCH channel in the reference format as the transmission power of the PUCCH channel if no the PUCCH is transmitted.

19. The user equipment according to claim 18, wherein:
the processing module is configured to control the calculation module to calculate the PH corresponding to the UL CC according to a following way: controlling the calculation module to calculate PHs corresponding to all configured UL CCs, or controlling the calculation module to calculate PHs corresponding to all activated UL CCs in the configured UL CCs, or controlling the calculation module to calculate all UL CCs with data scheduling in the configured UL CCs.

20. The user equipment according to claim 18, wherein:
the processing module is further configured to encapsulate all or parts of the PH corresponding to the UL CC which need to be reported in an identical PHR in order, and carry one piece of mode indicating information in the PHR, and then report the PHR to the eNB; or carry the mode indicating information with a logical channel identifier (LCID) corresponding to the PHR, and report to the eNB the mode indicating information along with the PHR; wherein,
the mode indicating information is used to indicate 3 modes of the PHR, wherein, in a first mode, the PHR comprises the type1 PH corresponding to the UL PCC and the type1 PH corresponding to the UL SCC; in a second mode, the PHR comprises the type1 PH and the type2 PH corresponding to the UL PCC, and the type1 PH corresponding to the UL SCC; in a third mode, the PHR comprises the type2 PH corresponding to the UL PCC, and the type1 PH corresponding to the UL SCC.

* * * * *